United States Patent
Widzgowski

(10) Patent No.: US 6,894,271 B2
(45) Date of Patent: May 17, 2005

(54) METHOD FOR OPERATING A POSITIONING APPARATUS, AND SCANNING MICROSCOPE

(75) Inventor: Bernd Widzgowski, Dossenheim (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 54 days.

(21) Appl. No.: 10/287,069

(22) Filed: Nov. 4, 2002

(65) Prior Publication Data

US 2003/0089845 A1 May 15, 2003

(30) Foreign Application Priority Data

Nov. 15, 2001 (DE) .......................................... 101 56 235

(51) Int. Cl.[7] .............................. H01J 3/14; H01J 40/14; H01J 5/16
(52) U.S. Cl. ........................ 250/234; 250/230; 359/198; 359/212
(58) Field of Search ........................ 250/230, 234–235; 359/198–199, 212–213, 221; 358/494

(56) References Cited

U.S. PATENT DOCUMENTS 6,037,583 A * 3/2000 Moehler et al. ............ 250/235
6,072,625 A * 6/2000 Kitahara et al. ............ 359/388

FOREIGN PATENT DOCUMENTS

DE 19702752 7/1998

* cited by examiner

Primary Examiner—Stephone B. Allen
Assistant Examiner—Patrick J. Lee
(74) Attorney, Agent, or Firm—Davidson, Davidson & Kappel, LLC

(57) ABSTRACT

A method for operating a positioning apparatus that moves a positioning element comprises the steps of: generating a first and at least one further reference signal, the first reference signal corresponding to a first reference position and the further reference signal to a further reference position; generating a first and at least one further estimated value for the present position of the positioning drive; transferring the first reference signal and the estimated value to the positioning apparatus; establishing the first reference position using the positioning apparatus, and measuring the present position and generating a position signal that corresponds to the measured present position; transferring the further reference signal to the positioning apparatus; generating a further estimated value of the positioning drive position; transferring the further estimated value to the positioning apparatus; establishing the further reference position, and measuring a further present position and generating a further position signal that corresponds to the measured further present position; and cyclically repeating the steps at constant time intervals.

13 Claims, 2 Drawing Sheets

METHOD FOR OPERATING A POSITIONING APPARATUS, AND SCANNING MICROSCOPE

CROSS REFERENCE TO RELATED APPLICATIONS

This application claims priority of the German patent application 101 56 235.7 which is incorporated by reference herein.

FIELD OF THE INVENTION

The invention concerns a method for operating a positioning apparatus that moves a positioning element.

The invention furthermore concerns a scanning microscope.

BACKGROUND OF THE INVENTION

In scanning microscopy, a specimen is illuminated with a light beam in order to observe the reflected or fluorescent light emitted by the specimen. The focus of the illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection stop, and the detectors for detecting the detected or fluorescent light. The illuminating light is coupled in via a beam splitter. The fluorescent or reflected light coming from the specimen travels through the beam deflection device back to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers.

Ideally, the track of the scanning light beam on or in the specimen describes a meander (scanning one line in the X direction at a constant Y position, then stopping the X scan and slewing by Y displacement to the next line to be scanned, then scanning that line in the negative X direction at constant Y position, etc.).

The power level of the light coming from the specimen is measured at fixed time intervals during the scanning operation, and thus sampled one grid point at a time. The measured value must be unequivocally allocated to the scan position associated with it so that an image can be generated from the measured data. It is useful if the status data of the displacement elements of the beam deflection device are also continuously measured for this purpose or, although this is less accurate, if the reference control data of the beam deflection device are used.

Accurate allocation of the position signals to the detected signals is particularly important. In making the allocation, transit time differences and the differing processing times of the detectors acquiring the signals must be taken into account, for example using delay elements. Very stringent stability requirements must be imposed. For example, for an image width of 1000 image points, the transit time fluctuations must remain well below 0.1%.

As the scanning speed becomes greater, the scanning track deviates more and more from the meander shape. This phenomenon is essentially attributable to the inertia of the moving elements. With rapid scanning, the scanning track is more similar to a sine curve, and it often happens that the trajectory portion when scanning in the positive X direction differs from the trajectory portion when scanning in the negative X direction.

German Patent Application DE 197 02 752 discloses a triggering system for a scanner, in particular for a laser scanning microscope, having: an oscillating motor for driving an oscillating mirror that serves to deflect a beam in linearly oscillating fashion; a triggering unit for supplying to the oscillating motor an excitation current that is modifiable in terms of triggering frequency, frequency curve, and amplitude; a function generator that is connected to the triggering unit; and a measured value transducer for obtaining a sequence of data about the deflection positions of the oscillating mirror. The triggering system is characterized in that the measured value transducer is linked to the function generator via a logic unit for ascertaining correction values for the excitation current. It is thereby possible, by evaluating the data made available by the measured value transducer concerning the actual deflection position of the oscillating mirror, to ascertain correction values using the logic unit. Those values can in turn be used to influence the triggering frequencies outputted by the function generator in such a way that the deviations are minimized or entirely eliminated.

The position signal of a positioning element, in particular the position sensor of a galvanometer (actual signal), is affected by interference signals. These interference signals overlie the usable signal and falsify it. If that position signal is then used in a scanning system to determine the position of a scanned data value, it thus results in a position error.

The interference can be divided into several categories: on the one hand there is stochastic interference such as e.g. noise, etc.; on the other hand there is non-stochastic interference such as e.g. incoupling from other sources, distortion, nonlinear transmission effects, etc.

If, in scanning microscopy, an image sequence is generated using the measured values, that sequence then exhibits defects because of the interference. The stochastic interference causes a positional uncertainty, i.e. the position of an image point fluctuates from one image to the next (jitter). The non-stochastic interference can cause positional falsification, which can fluctuate (incouplings) or can be constant over time (distortion, nonlinear transmission effects). The interference on the one hand causes the image sequence to look unsteady, and on the other hand can make it appear distorted. If image data from the forward and return directions of the scan are used, it may happen that the images of structures that occur in two successive lines can no longer be superimposed. Such structures perpendicular to the scanning direction therefore appear to be "fringed." If the higher-frequency components of the interference spectrum are considered, these may derive only from the measurement system due to the mechanical inertia of the galvanometer.

Thermal and other drift effects cause the delay time between the exciting signal and the position of the galvanometer mirror to change. As a result, with a bidirectional scan the forward and return lines drift apart from one another. This effect must be compensated for manually, in unchangeable fashion. This effect occurs in particular when a generated position signal is used to determine the position of the scan data.

SUMMARY OF THE INVENTION

It is therefore the object of the invention to describe a method for operating a positioning apparatus that allows to achieve a higher accuracy and which allows both the generation of a position signal and tracking of the phase drift.

The object is achieved by way of a method characterized by the following steps:

a. generating a first and at least one further reference signal, the first reference signal corresponding to a first reference position and the further reference signal to a further reference position;

b. generating a first and at least one further estimated value for the present position of the positioning drive;

c. transferring the first reference signal and the estimated value to the positioning apparatus;

d. establishing the first reference position using the positioning apparatus, and measuring the present position and generating a position signal that corresponds to the measured present position;

e. transferring the further reference signal to the positioning apparatus;

f. generating a further estimated value of the positioning drive position;

g. transferring the further estimated value to the positioning apparatus;

h. establishing the further reference position, and measuring a further present position and generating a further position signal that corresponds to the measured further present position; and i. cyclically repeating steps b. through e. at constant time intervals.

A further object of the invention is to describe a scanning microscope that makes possible a largely defect-free image of a specimen using scanning microscopy.

This object is achieved by a scanning microscope that has the following features:

a. a light source that emits a light beam for illumination of a specimen;

b. a positioning apparatus, for guiding the light beam over a specimen, that moves a positioning element into a definable reference position;

c. a control unit with which a first and at least one further reference signal can be generated and repetitively transferred to the beam deflection device;

d. an apparatus for ascertaining the positions of the beam deflection device;

e. an apparatus for ascertaining features that characterize the position of the beam deflection device, the unit for calculation encompassing a definable algorithm;

f. a unit for calculating correction values from the ascertained features, the unit for calculation encompassing a definable algorithm.

The invention has the advantage of making possible both the generation of a position signal, in particular in scanners having galvanometers, and tracking of the phase drift.

With regard to generation of a position signal, in particular in scanners having galvanometers, an estimated position signal is generated in a rigid time correlation with the excitation signal of the galvanometer, and used to determine the column number of the data. This position signal is generated in such a way that a distortion correction of the image is performed.

With regard to the tracking of phase drift in galvanometer scanners, a phase distortion measurement and an automatic compensation are performed. The present phase position of the position signal must be determined by suitable evaluation of the measured position signal (zero transition, correlation function with the setpoint or a suitable reference signal, etc.). Since only individual features need to be extracted from the measured position signal, known methods are used that are particularly robust with respect to interference occurring in the specific system.

In a preferred embodiment, the zero transition of the reference signal is compared to the (delayed) zero transition of the actual signal. An additional low-pass filter serves to filter out short-term fluctuations. A specific delay then results therefrom. The starting point for image acquisition is then correspondingly displaced for each line. Jitter is thereby minimized (since a position signal is generated using a specific "reference signal"), and at the same time drift (over the longer term) is compensated for by tracking the phase distortion.

In a variant embodiment, the method contains the further step of improving the signal quality of the generated position signal using suitable actions such as e.g. filters. In another variant embodiment, the method contains the further step of extracting from the generated position signals, at each cyclical pass or for a group of cycles and using a definable algorithm, the features that describe the sequence of positions actually reached.

The steps of ascertaining correction values from the measured position values using a definable algorithm, and optimizing the estimated values for the position signal on the basis of the ascertained correction values using a further definable algorithm, are preferably also performed. The definable algorithm preferably contains an averaging function and/or a filter function.

In a preferred embodiment, provision is made for the position signals to be transformed into digital values using an analog/digital converter. Provision is moreover made for the positioning apparatus to be a beam deflection device. The positioning apparatus can contain a galvanometer. In a preferred embodiment, the positioning element contains a mirror. The positioning apparatus preferably serves to guide a light beam over a specimen and to detect the light proceeding from the specimen with a detector and convert it into a detected signal. Each reference position of the positioning element has at least one scan position in the specimen associated with it. According to the present invention, the method contains the step of allocating at least one detected signal to each estimated position signal.

The apparatus for ascertaining the position contains a position sensor that ascertains the present position of the positioning element. Also provided, in a preferred embodiment, is an analog/digital converter for converting the position signal of the positioning drive into a digital signal.

In a preferred embodiment, the light proceeding from the specimen is detectable with a detector and can be converted into a detected signal, and at least one detected signal can be allocated to each reference position of the positioning element. The allocation encompasses consideration of the calculated time correction value. The scanning microscope is preferably embodied as a confocal scanning microscope.

BRIEF DESCRIPTION OF THE DRAWINGS

The subject matter of the invention is schematically depicted in the drawings and will be described below with reference to the Figures, in which.

DETAILED DESCRIPTION OF THE INVENTION

Figure 1:
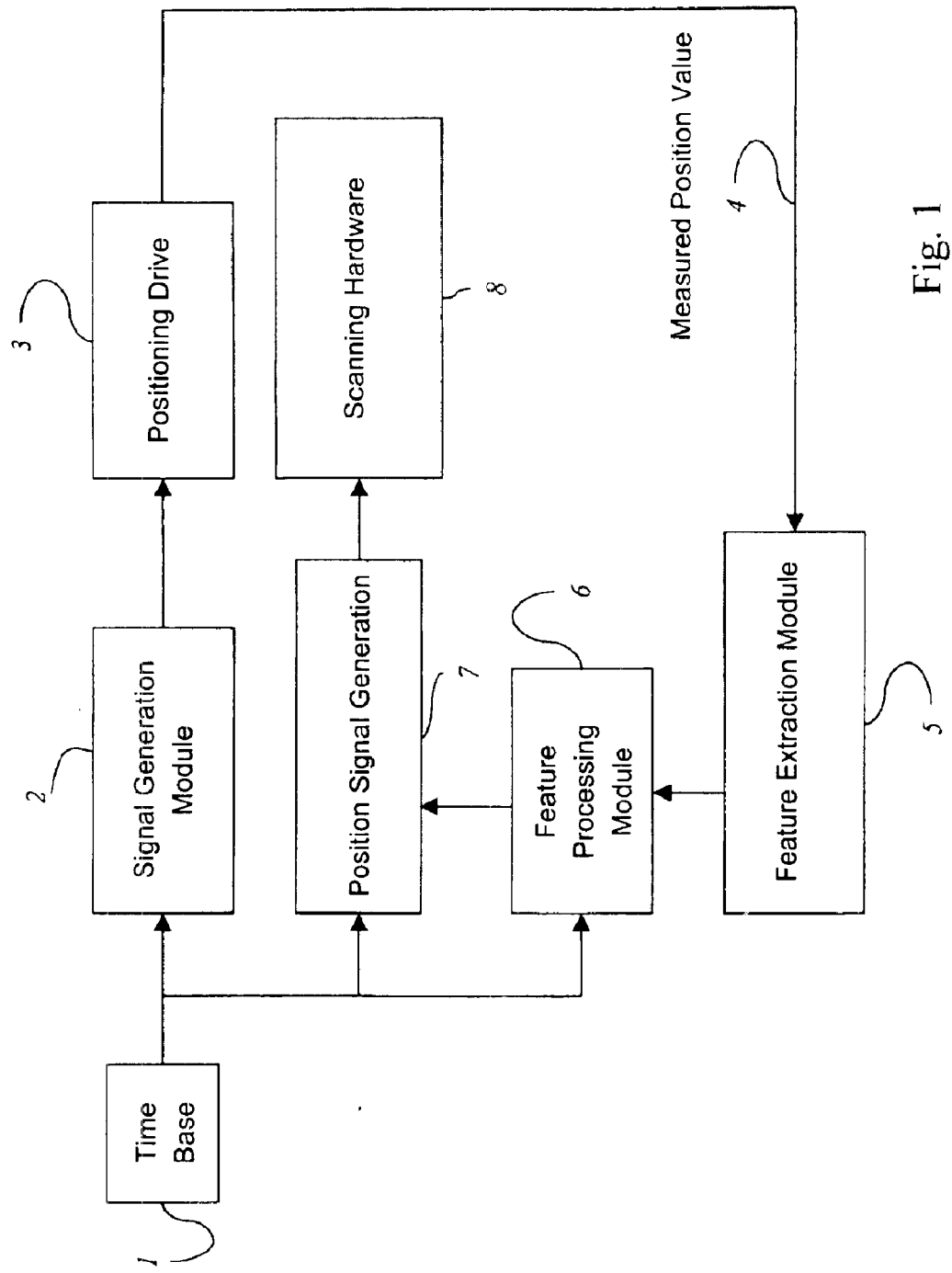
FIG. 1 shows a flow chart of the method.

FIG. 1 shows a flow chart of the method. Time base 1 is configured as a ring counter. The period of one pass corresponds to the desired period of the galvanometer oscillation in the X direction. From this counter value, the position setpoint for a positioning drive 3 is generated in signal generation module 2. Positioning drive 3 contains a position measurement system. Measured position value 4 is conveyed to a feature extraction module 5, in which values characteristic of the position of the positioning drive are extracted. These values are conveyed to feature processing module 6 where, from these data and from the time values generated by time base 1, the correction values necessary for position signal generation 7 are generated. In the module for position signal generation 7, position values are generated from the time values deriving from time base 1 and from the correction values generated by feature processing module 6, and are fed into scanning hardware 8 for further processing.

Figure 2:
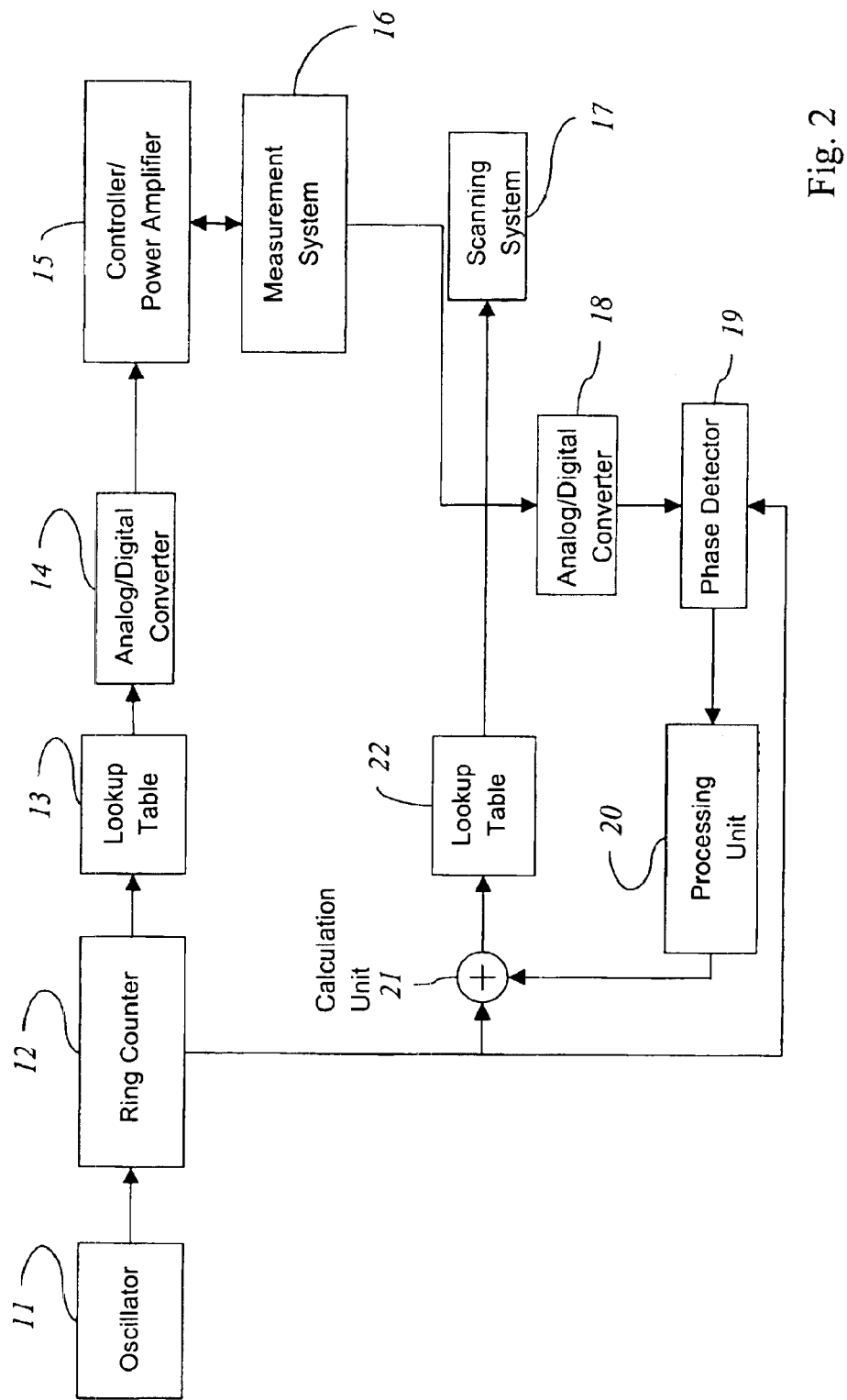
FIG. 2 shows an apparatus for generating a position signal.

FIG. 2 shows an apparatus for generating a position signal. An oscillator 11 controls a ring counter 12 that conveys its signal to an electronic lookup table 13. The signal read out from lookup table 13 is converted using an analog/digital converter 14 and conveyed to a controller/power amplifier 15. Measurement system 16 of the galvanometer positioning element also delivers its measurement signal to controller/power amplifier 15 and to a further analog/digital converter 18 that is followed by a phase detector 19 and a processing unit 20. The signals of the ring counter and of the processing unit are processed in a calculation unit 21 and conveyed to a further lookup table 22 and lastly to scanning system 17.

The invention has been described with reference to a particular embodiment. It is self-evident, however, that changes and modifications can be made without thereby leaving the range of protection of the claims below.

What is claimed is:

1. A method for operating a positioning apparatus that moves a positioning element for generating an image of a specimen comprising the steps of:
    a. generating a first and at least one further reference signal, the first reference signal corresponding to a first reference position of the positioning element and the further reference signal to a further reference position of the positioning element;
    b. generating a first and at least one further estimated value for a present position of the positioning element, the first and the at least one further estimated value being useable for distortion correction of the image;
    c. transferring the first reference signal and the first estimated value to the positioning apparatus;
    d. establishing the first reference position using the positioning apparatus, and measuring the present position and generating a position signal based on the measured present position and the first estimated value so as to provide distortion correction of the image;
    e. transferring the further reference signal to the positioning apparatus;
    f. transferring the further estimated value to the positioning apparatus;
    g. establishing the further reference position, and measuring a further present position of the positioning element and generating a further position signal that based on the measured further present position and the further estimated value so as to provide distortion correction of the image.

2. The method as defined in claim 1, comprising the further step of
    improving the signal quality of the generated position signal.

3. The method as defined in claim 1, comprising the further steps of
    cyclically repeating steps b. through e. at constant time intervals; and
    extracting from the generated position signals, at each cyclical pass or for a group of cycles and using a definable algorithm, the features that describe the sequence of positions actually reached.

4. The method as defined in claim 1, comprising the further steps of
    ascertaining correction values from the measured position values using a definable algorithm; and
    optimizing the estimated values for the position signal on the basis of the in ascertained correction values using a further definable algorithm.

5. The method as defined in claim 4, wherein the definable algorithm contains an averaging function.

6. The method as defined in claim 4, wherein the definable algorithm contains a filter function.

7. The method as defined in claim 1, wherein the present position and the further present position of the positioning element are transformed into digital values using an analog/digital converter.

8. The method as defined in claim 1, wherein the positioning apparatus is a beam deflection device.

9. The method as defined in claim 1, wherein the positioning apparatus contains a galvanometer.

10. The method as defined in claim 1, wherein the positioning element contains a mirror.

11. The method as defined in claim 1, wherein a light beam is guided over a specimen using the positioning apparatus, and the light proceeding from the specimen is detected with a detector and converted into a detected signal.

12. The method as defined in claim 11, wherein at least one scan position in the specimen is associated with each reference position of the positioning element.

13. The method as defined in claim 11, characterized by the further step of
    allocating at least one detected signal to each estimated position signal.

* * * * *